United States Patent
Bader et al.

(10) Patent No.: US 8,719,032 B1
(45) Date of Patent: May 6, 2014

(54) METHODS FOR PRESENTING SPEECH BLOCKS FROM A PLURALITY OF AUDIO INPUT DATA STREAMS TO A USER IN AN INTERFACE

(71) Applicant: Jefferson Audio Video Systems, Inc., Louisville, KY (US)

(72) Inventors: Matthew David Bader, Louisville, KY (US); Nathan David Cole, Louisville, KY (US)

(73) Assignee: Jefferson Audio Video Systems, Inc., Louisville, KY (US)

( * ) Notice: Subject to any disclaimer, the term of this patent is extended or adjusted under 35 U.S.C. 154(b) by 0 days.

(21) Appl. No.: 14/103,369

(22) Filed: Dec. 11, 2013

(51) Int. Cl.
G10L 21/0272 (2013.01)
G10L 21/10 (2013.01)
G06F 3/16 (2006.01)
H04L 12/18 (2006.01)

(52) U.S. Cl.
USPC ...... 704/270; 704/276; 370/260; 379/202.01; 715/727

(58) Field of Classification Search
CPC ....... G10L 21/0272; G10L 21/10; G06F 3/16; H04L 12/18
USPC .................. 704/248, 276, 278, 270; 715/727; 370/260, 261; 379/202.01
See application file for complete search history.

(56) References Cited

U.S. PATENT DOCUMENTS

| | | | |
|---|---|---|---|
| 4,375,083 A * | 2/1983 | Maxemchuk | 704/278 |
| 5,559,881 A * | 9/1996 | Sih | 379/406.08 |
| 5,675,707 A * | 10/1997 | Gorin et al. | 704/257 |
| 5,765,132 A | 6/1998 | Roberts | |
| 6,055,495 A * | 4/2000 | Tucker et al. | 704/210 |
| 6,064,964 A * | 5/2000 | Yamamoto et al. | 704/270 |
| 6,161,087 A | 12/2000 | Wightman et al. | |
| 6,374,219 B1 | 4/2002 | Jiang | |
| 6,405,168 B1 | 6/2002 | Bayya et al. | |
| 6,529,870 B1 * | 3/2003 | Mikkilineni | 704/246 |
| 6,748,356 B1 * | 6/2004 | Beigi et al. | 704/245 |
| 6,763,329 B2 | 7/2004 | Brandel et al. | |
| 7,143,038 B2 | 11/2006 | Katae | |
| 7,277,847 B2 | 10/2007 | Berger | |
| 7,392,182 B2 | 6/2008 | Nuessle et al. | |
| 7,433,822 B2 | 10/2008 | Buchholz et al. | |

(Continued)

FOREIGN PATENT DOCUMENTS

| | | |
|---|---|---|
| EP | 0806092 | 11/1997 |
| EP | 0811906 | 12/1997 |

(Continued)

OTHER PUBLICATIONS

Abstract and English Machine Translation for European Patent No. EP 1077448.

Primary Examiner — Martin Lerner
(74) Attorney, Agent, or Firm — Frost Brown Todd LLC (57) ABSTRACT

A clear picture of who is speaking in a setting where there are multiple input sources (e.g., a conference room with multiple microphones) can be obtained by comparing input channels against each other. The data from each channel can not only be compared, but can also be organized into portions which logically correspond to statements by a user. These statements, along with information regarding who is speaking, can be presented in a user friendly format via an interactive timeline which can be updated in real time as new audio input data is received.

2 Claims, 5 Drawing Sheets

(56) References Cited

U.S. PATENT DOCUMENTS

| | | | |
|---|---|---|---|
| 7,545,758 B2* | 6/2009 | Caspi et al. | 370/260 |
| 7,558,224 B1* | 7/2009 | Surazski et al. | 370/289 |
| 7,738,637 B2 | 6/2010 | Schmandt et al. | |
| 7,940,705 B2* | 5/2011 | Shaffer et al. | 370/261 |
| 7,995,732 B2* | 8/2011 | Koch et al. | 379/204.01 |
| 8,010,360 B2* | 8/2011 | Bacchiani et al. | 704/252 |
| 8,036,899 B2 | 10/2011 | Sobol-Shikler | |
| 8,117,032 B2 | 2/2012 | Charoenruengkit et al. | |
| 8,175,876 B2 | 5/2012 | Bou-Ghazale et al. | |
| 8,190,432 B2 | 5/2012 | Matsumoto | |
| 8,204,198 B2* | 6/2012 | Adeney | 379/202.01 |
| 8,249,870 B2* | 8/2012 | Roy et al. | 704/244 |
| 8,269,625 B2 | 9/2012 | Hoy et al. | |
| 8,270,587 B2* | 9/2012 | Noldus et al. | 379/202.01 |
| 8,279,796 B1 | 10/2012 | Cleveland et al. | |
| 8,290,124 B2* | 10/2012 | Mikan et al. | 379/68 |
| 8,306,204 B2* | 11/2012 | Erhart et al. | 379/202.01 |
| 8,390,669 B2* | 3/2013 | Catchpole et al. | 348/14.08 |
| 8,447,023 B2 | 5/2013 | Nimri et al. | |
| 8,488,749 B2* | 7/2013 | Mikan et al. | 379/68 |
| 8,634,708 B2* | 1/2014 | Chevallier et al. | 386/343 |
| 2006/0020658 A1* | 1/2006 | Goodman et al. | 709/201 |
| 2007/0266092 A1 | 11/2007 | Schweitzer | |
| 2007/0288238 A1* | 12/2007 | Hetherington et al. | 704/248 |
| 2008/0059197 A1 | 3/2008 | Jones et al. | |
| 2008/0215324 A1* | 9/2008 | Hirohata | 704/246 |
| 2009/0150151 A1* | 6/2009 | Sakuraba et al. | 704/246 |
| 2009/0238377 A1 | 9/2009 | Ramakrishnan et al. | |
| 2010/0246448 A1 | 9/2010 | Krantz et al. | |
| 2011/0083074 A1* | 4/2011 | Jellison et al. | 715/716 |
| 2011/0285808 A1 | 11/2011 | Feng et al. | |
| 2012/0063573 A1 | 3/2012 | Sylvain | |
| 2012/0114158 A1 | 5/2012 | Gysin | |
| 2012/0237037 A1 | 9/2012 | Ninan et al. | |
| 2012/0303361 A1 | 11/2012 | Rutten et al. | |
| 2012/0323575 A1 | 12/2012 | Gibbon et al. | |
| 2012/0331066 A1 | 12/2012 | FitzGerald | |
| 2013/0022189 A1 | 1/2013 | Ganong, III et al. | |
| 2013/0022216 A1 | 1/2013 | Ganong, III et al. | |
| 2013/0024196 A1 | 1/2013 | Ganong, III et al. | |
| 2013/0198635 A1* | 8/2013 | Jones et al. | 715/727 |

FOREIGN PATENT DOCUMENTS

| | | |
|---|---|---|
| EP | 1077448 | 2/2001 |
| EP | 1423846 | 6/2004 |
| EP | 1610301 | 12/2005 |
| EP | 2255344 | 12/2010 |
| WO | WO 97/11533 | 3/1997 |
| WO | WO 03/015079 | 2/2003 |
| WO | WO 03/023765 | 3/2003 |
| WO | WO 2004/019317 | 3/2004 |
| WO | WO 2009/104968 | 8/2009 |
| WO | WO 2012/176199 | 12/2012 |

\* cited by examiner

METHODS FOR PRESENTING SPEECH BLOCKS FROM A PLURALITY OF AUDIO INPUT DATA STREAMS TO A USER IN AN INTERFACE

FIELD

The disclosed technology pertains to recording and managing multiple audio inputs on a computer.

BACKGROUND

There are many contexts, such as during legal proceedings or business meetings, in which it is necessary to record and/or transcribe statements of multiple participants. While there exists technology (e.g., audio recording software) which can be used to facilitate these processes, there are many problems with existing technology. For example, while existing technology can make audio recordings of a multi-party interaction, when multiple parties are speaking simultaneously, it can be difficult to determine which party is saying what. To some extent, this difficulty can be addressed by using multiple input devices for multiple parties (e.g., different microphones for a witness, a judge, and an examining attorney). However, using multiple input devices can introduce further complications when (as is often the case in multi-party interactions) a statement by one individual is picked up by two or more input devices. Accordingly, there is a need for technology which can address one or more of the issues currently associated with the recording and/or transcription of multi-party interactions.

SUMMARY

The technology disclosed herein can be used configure a computer to record and identify audio from multiple audio input sources. A computer configured in such a way could be in communication with a plurality of audio input devices, such as microphones, which could be in the same room or in separate rooms, and could receive audio input data streams from the plurality of audio input devices in real time as they captured audio. Received audio input data streams could initially be filtered based upon their amplitude, with audio input data streams which do not meet a configurable amplitude threshold value being discarded. This set of initially filtered audio input data streams could contain two or more substantially similar audio input data streams, such as where a spoken word in a room is captured by more than one microphone. The computer could examine the two or more substantially similar audio input data streams and retain the audio input data stream which was created intentionally while discarding those which were created incidentally, as in the case where one speaks into a first microphone and is unintentionally captured by a second microphone in the same room. The computer could accomplish this by choosing to retain the audio input data stream which was received from the audio input source which was proximate to the origin of the captured audio (e.g., as indicated by having the greatest volume as received). Retained audio input data streams could be identified as qualified audio.

A computer configured such as described above could be further configured to combine audio from the individual audio input devices into distinct speech blocks in real time as it is received and stored. Such speech blocks can comprise one or more qualified audio input data streams received from the same audio input source, and can have a variety of statuses before and during their creation. For example, a computer could be configured to, when it initially receives audio input data from an audio input source, create a new speech block with a status of 'pending' to receive that audio input data. A computer could be configured to modify speech block with a status of 'pending' by, for example, appending received qualified audio to the speech block if it arrives within a first intervening duration threshold of the end of the most recent qualified audio from the audio input source. Speech blocks can also have other statuses, such as 'confirmed,' 'pending,' 'committed,' or 'discarded,' and the technology described herein can be used to configure a computer to treat such speech blocks differently based on their statuses. For example, for speech blocks having a status of 'committed,' a computer could be configured to modify those speech blocks by performing acts such as appending received a qualified audio to the speech block if it arrives within a second intervening duration threshold of the end of the most recent qualified audio from the audio input source. Similarly, the technology described herein could also be used to change the statuses of speech blocks. For example, the technology disclosed herein could be used to configure a computer to change the status of a 'pending' speech block to 'committed' if that speech block reaches a length which exceeds a minimum threshold.

A computer configured such as described above could also be configured to display information about the qualified audio in real time as it is captured and categorized by audio source input and speech block through an audio timeline. The audio timeline could display rows of audio inputs with speech blocks as columns, such that a user could step forward and backwards along the timeline to review speech blocks previously and currently captured. The audio timeline could be further configured to display audio inputs and speech blocks with various types of statuses in a plurality of user selected visual cues to enable real time interpretation of the audio timeline by the user.

Similarly, other methods, machines, and articles of manufacture could also be implemented based on this disclosure by those of ordinary skill in the art without undue experimentation, and so the preceding summary, as well as the descriptions and drawings set forth herein, should be understood as being illustrative only, and not limiting.

BRIEF DESCRIPTION OF THE DRAWINGS

The drawings and detailed description which follow are intended to be merely illustrative and are not intended to limit the scope of the invention as contemplated by the inventors.

DETAILED DESCRIPTION

The inventors have conceived of novel technology which, for the purpose of illustration, is disclosed herein as applied in the context of simultaneously recording and organizing audio from multiple channels. While the disclosed applications of the inventors' technology satisfy a long felt but unmet need in the art of recording and organizing audio from multiple sources, it should be understood that the inventors' technology is not limited to being implemented in the precise manners set forth herein, and could be implemented in other manners without undue experimentation by those of ordinary skill in the art in light of this disclosure. Accordingly, the examples set forth herein should be understood as being illustrative only, and should not be treated as limiting.

Figure 1:
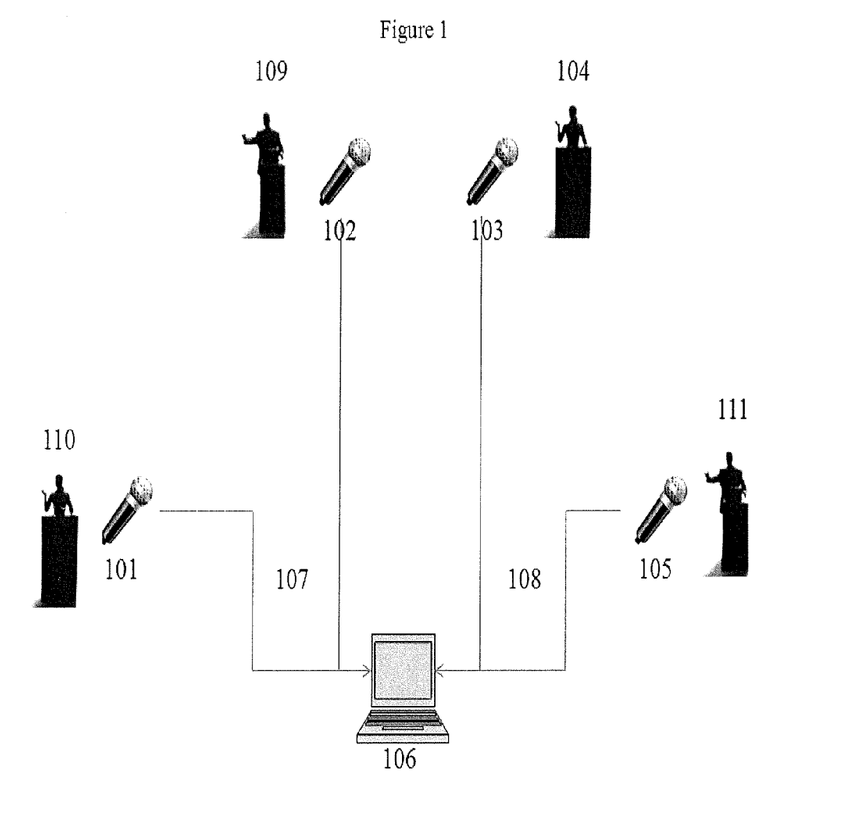
FIG. 1 depicts an architecture comprising a computer configured to receive audio input data streams from a plurality of microphones, placed near a plurality of speakers.

Turning now to the figures, FIG. 1 depicts an example of an architecture comprising a computer [106] configured to receive audio input data streams representing, for example, spoken words or phrases from speakers [104][109][110][111] captured via a plurality of audio input sources, (in this example a plurality of microphones [101] [102][103][105]) connected to the computer [106] (in this example via a plurality of Ethernet cables [107][108], though other types of connection media, such as wireless connections, could also be used). Although FIG. 1 shows a 1:1 ratio between speakers [104][109][110][111] and audio input sources [101][102][103][105] it should be understood that there is no required ratio between speakers and audio input sources. The architecture shown in FIG. 1 could be used to capture and organize audio for a variety of live meetings, including but not limited to staff meetings, project meetings, courtroom proceedings, depositions, and any other scenario where capturing and organizing audio from multiple channels in real time could be useful.

Figure 2:
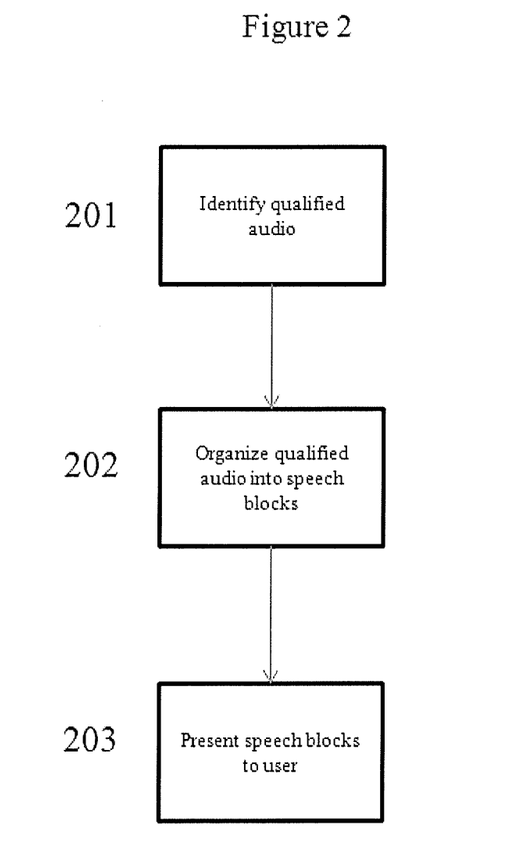
FIG. 2 illustrates a high level example of a method which could be used for capturing audio from multiple channels and making it available to a user.

Turning now to FIG. 2, that figure illustrates a high level example of a method which could be used for capturing audio from multiple channels and making it available to a user through a computer such as that shown in FIG. 1. Following FIG. 2, the method shown in that figure begins with a step of identifying qualified audio [201]. This step can be performed, for example, by, after receiving audio input data streams from one or more of the plurality of audio input sources (e.g., microphones [101][102][103][105] shown in FIG. 1), determining whether audio data in those data streams has characteristics (e.g., volume) that suggest it should be subjected to further analysis (e.g., if the audio data has a volume which exceeds a threshold value assigned to a noise level associated with silence by the relevant speaker). Once qualified audio has been identified [201], the method of FIG. 2 continues with a step of organizing the qualified audio into speech blocks [202]. This step could include, for example, combining one or more pieces of qualified audio received from a single audio input source into a larger structure representing one or more connected sounds (i.e., a "speech block," which could represent, for example, a statement made up of a series of words). Finally, FIG. 2 illustrates that, after the qualified audio has been organized into speech blocks [202] those speech blocks can be presented to a user [203]. For example, a user could be presented with an interface displaying what speech blocks were detected from each of the input devices along with the starting and ending times for each of those block, and could be allowed to select a speech block in order to play the qualified audio associated therewith.

Of course, it should be understood that, while the above discussion explained how the identification of qualified audio [201], organization of the qualified audio into speech blocks [202] and presentation of the speech blocks to a user [203] could take place in sequence, such sequential performance of steps is not necessary in implementations in which a method such as shown in FIG. 2 is performed. For example, rather than presenting speech blocks only after the identification and organization of qualified audio into speech blocks is complete, the disclosed technology could be used to configure a computer to continuously identify and organize qualified audio into speech blocks on a frame by frame basis as individual frames of audio data are received, and to present the speech block information to a user in real time. Such real time presentation of speech block information could not only allow a user to see the growth of a speech block as it is created, but could also allow users to be presented with candidate speech blocks (i.e., portions of qualified audio which have not satisfied requirements necessary to avoid being discarded), potentially in a manner which would make the status of those candidate blocks clear (e.g., in an interface where speech blocks from different input sources are displayed in different colors, a speech block which is still subject to being discarded might be depicted using a transparent version of the color normally associated with its input source).

Similarly, rather than completing identification of qualified audio [201] before organizing the qualified audio into speech blocks, the technology disclosed herein could be used to configure a computer to organize the qualified audio into speech blocks continuously in real time (e.g., by adding the audio input data from each of the input sources into a source specific buffer or other data structure associated with its input source as soon as it is received, determining whether the received data should be treated as qualified audio as soon as it is placed in the buffer or other data structure, and providing the qualified audio to a routine which would determine whether to add it to an existing speech block, use it to create a new speech block, or discard it, as soon as it was identified as qualified audio). Accordingly, FIG. 2 and the discussion associated therewith should be understood as being illustrative only, and should not be treated as limiting.

Figure 3:
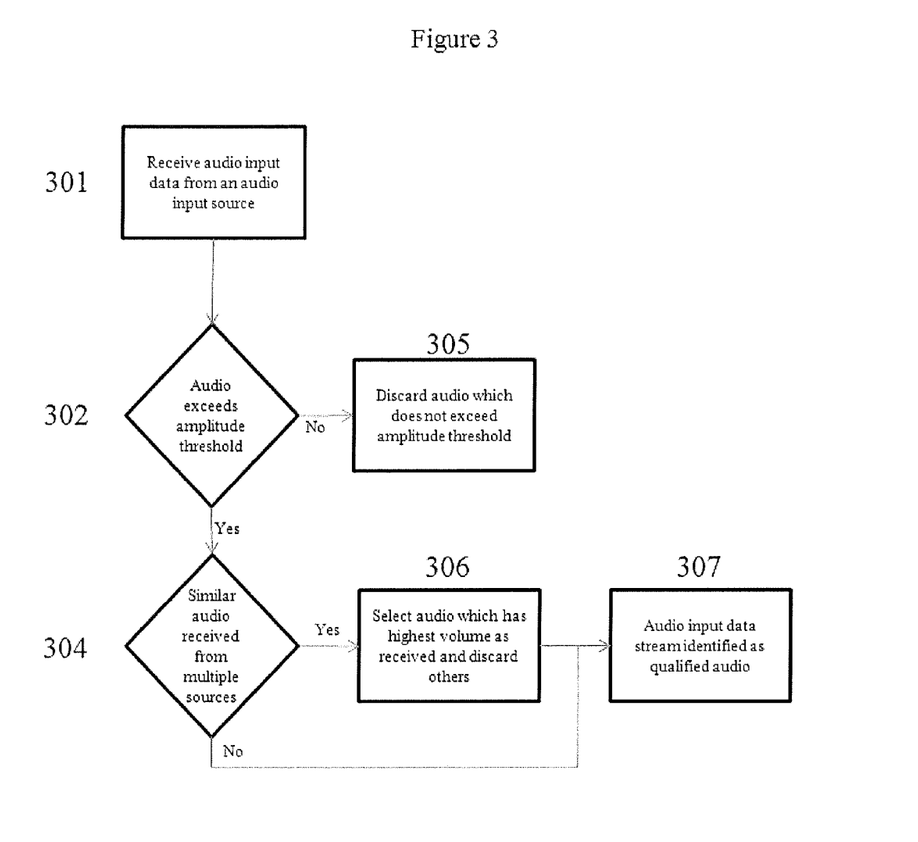
FIG. 3 illustrates the steps for identifying qualified audio and filtering out unqualified audio.

Turning now to FIG. 3, that figure illustrates an example of a particular set of steps which could be performed by a computer configured to identify qualified audio [201] in a method such as shown in FIG. 2. The method of FIG. 3 starts with receipt of data (e.g., an audio input data stream, or one or more frames thereof) from one or more audio input sources [301] (e.g., a computer receiving spoken words or phrases after they are is captured by whatever audio input data sources may be included in the relevant implementation). After the data is received [301], a computer configured to perform a method such as shown in FIG. 3 could proceed by examining [302] the data received from each audio input data source and discarding it [305] if its amplitude (e.g., amplitude for the frame, in the event qualified audio is identified on a frame by frame basis, or various composites, such a average amplitudes across frames, in the event qualified audio is determined for portions of audio data greater than a single frame in length) does not exceed a threshold value. This type of filtering could be performed, for example, to address situations where the audio input data is captured in a noisy environment, or to simply avoid performing unnecessary analysis on periods of silence from an audio input data stream.

Alternatively, as shown in FIG. 3, if received data is not discarded, a further check [304] can be made to determine if there is similar audio received from multiple sources (e.g., using waveform analysis, or by determining if two distinct (though presumably proximately located) input devices began detecting audio data at substantially the same time). This similar audio could be, for example, 'cross-talk' audio, which occurs when a speaker utters a word or phrase which is captured by both an audio input source associated with that speaker and also at least one other audio input source (e.g., if a speaker is speaking loudly and his or her voice is picked up on multiple microphones). After the determination as to whether similar audio has been received from multiple input sources [304] has been made, if it is determined that similar audio was received from multiple input sources, then the similar audio data will be examined and all except for the data with the highest amplitude will be discarded [306]. Finally, the remaining audio (e.g., whatever audio both exceeded the amplitude threshold and was not discarded as having lower amplitude than similar audio received from another source) will be identified as qualified audio [307], which can be stored or subjected to further processing in real time.

Of course, it should be understood that, while the above description traced the steps depicted in FIG. 3 as if they were performed individually in sequence, such steps could also be performed multiple times asynchronously and independently from each other, such that multiple audio input data streams arriving from multiple audio input sources at substantially the same time could be identified as qualified audio. As an example, if a first speaker [104] and a second speaker [110] both speak at the same time, and both are captured by their proximate audio input source as well as the audio input source of the other [103][101], then both audio input data streams will be checked for qualified audio. In this type of scenario, the two audio input streams, though occurring at substantially the same time, might (depending on the similarity tests used in the relevant implementation) not be identified as being similar to each other and therefore could each be identified as qualified audio.

Further, just as it is possible that the steps illustrated in FIG. 3 could be performed in different manners (e.g., in series or in parallel), it is also possible that the identification of qualified audio could be performed using steps other than those shown in FIG. 3. For example, while not illustrated in FIG. 3, it is possible that a method for identifying qualified audio based on amplitude thresholds could include steps to dynamically calculate and/or recalculate the threshold based upon the detection of a constant level of background noise over a period of time, such as the noise created by an air conditioner, with the result that the amplitude threshold could adjust upwards automatically to the same level as that of the constant background noise until it was removed from the environment.

Similarly, non-threshold based approaches to identification of qualified audio are also possible. For example, where the disclosed technology is deployed to assist in the creation of transcripts, qualified audio could be detected by comparing received audio data with one or more waveform profiles representing sounds which should be included in the transcript (e.g., spoken words or phrases) and/or sounds which should not be included in the transcript (e.g., shuffling of papers) and treating only the sounds which should be included in the transcript as qualified audio. Accordingly, the approaches and steps for identification of qualified audio discussed above in the context of FIG. 3 should be understood as being illustrative only, and should not be treated as limiting.

Figure 4:
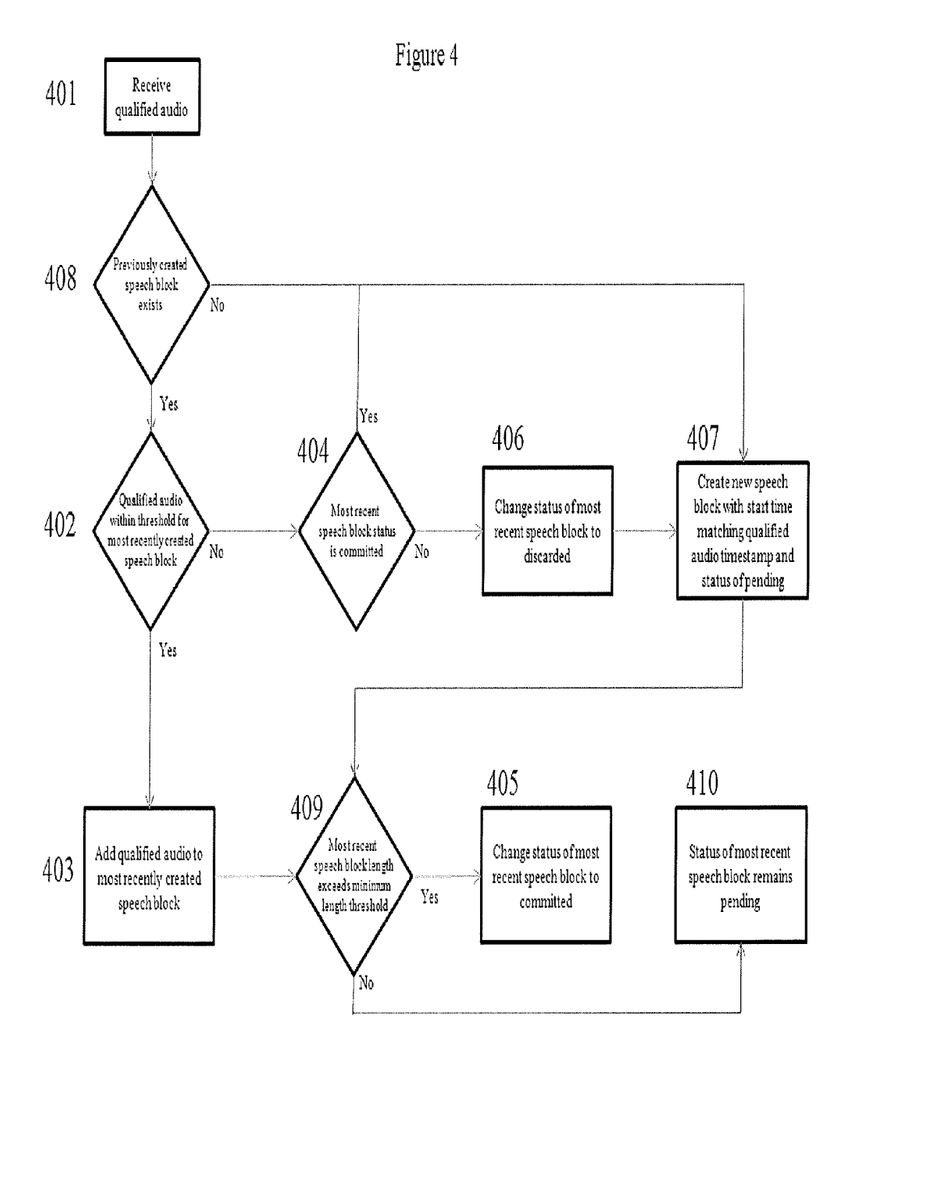
FIG. 4 illustrates the steps for organizing qualified audio into speech blocks.

Turning now to FIG. 4, that figure illustrates an example of a set of steps which a computer configured according to the teachings of this disclosure could perform on qualified audio to organize it into distinct speech blocks [202]. In the method of FIG. 4, once qualified audio is received/identified [401] a check [408] could be made to determine if at least one speech block has already been created from audio received from the source of the qualified audio and not discarded prior to the receipt [401] of the qualified audio. If there is no previously created speech block for the source of the qualified audio, new speech block could be created [407] with start and end times matching the start and end times for the qualified audio (e.g., as shown by a timestamps created upon receipt), and a status of 'pending' [407] (e.g., internal data which could be maintained by a computer performing a method such as shown in FIG. 4 which indicates that qualified audio has been added to the speech block, but that there is still some further requirement for the speech block to satisfy to avoid being discarded).

Alternatively, if there is a previously created speech block for the source of the qualified audio, a further check [402] can be made to determine if condition(s) for appending the qualified audio to the previously created speech block have been satisfied (which, in the illustrative method of FIG. 4, is a check of whether the difference between the qualified audio start time and the end time for the most recently created speech block is greater than an intervening duration time threshold). Based on this determination, the qualified audio can either be added [403] to the most recently created speech block for its input source (e.g., if the difference between start and end times is less than the intervening duration threshold, the end time for the most recently created speech block can be changed to the end time of the qualified audio), or used to create [407] a new speech block (which step, as shown in FIG. 4, could take place after checking [404] if the most recently created speech block had satisfied the requirement(s) necessary to avoid being discarded and discarding [406] the most recently created speech block as necessary).

Finally, in the process of FIG. 4, after a change has been made to a speech block (i.e., a new speech block has been created [407] or qualified audio has been added to an existing speech block [403]) a check [409] can be made to determine if that speech block meets the requirement(s) to avoid being discarded (which, in the illustrative method of FIG. 4, is based on a determination of whether the speech block's length exceeds a minimum length threshold, such as two seconds). If the requirement(s) is/are met the status of the speech block is set to 'committed' [405] (or, if the status is already set to committed, it can be left unchanged). Otherwise, the status of the speech block can be left as 'pending' [410]. This process could then be repeated as new qualified audio is received/identified [401], with speech blocks being created, committed, discarded and augmented with new qualified audio as appropriate.

As a concrete illustration of how steps of a process such as shown in FIG. 4 could take place, consider a scenario in which a speaker says "Excuse me", followed by an intermediate silence, and then "Could you repeat your answer?" In this scenario, once the statement "Excuse me" is received [401], a check [408] would be made as to whether a speech block had been created and not discarded for an input from the same input source as the statement "Excuse me." Since, in this scenario, the first qualified audio from the relevant input source is the statement "Excuse me", a new speech block would be created [407] with start and end times matching the beginning and ending of the statement "Excuse me." This speech block would then be checked [409] to see if it was longer than a minimum speech block length, and would have its status changed [405] to committed if the length of the statement "Excuse me" was longer than the minimum speech block length being used in the relevant implementation (e.g., 2 seconds).

The illustrative scenario would then continue with receipt [401] of further qualified audio from the same input source (i.e., the statement "Could you repeat your answer"). After that qualified audio is received [401], the check [408] of whether there exists a previously created speech block for that input source would indicate that such a block (i.e., the speech block created after receipt of "Excuse me") does exist, and so a further check [402] would be performed to determine if the start of the statement "Could you repeat your answer" was within the intervening duration time threshold of the end of the existing speech block. If it was within the intervening duration threshold (e.g., if the pause between "Excuse me"

and "Could you repeat your answer" is 700 milliseconds, and the intervening duration threshold is 1000 milliseconds) then the speech block could be expanded to include both "Excuse me" and "Could you repeat your question" (e.g., by changing its end time to the end time of "Could you repeat your question"). Otherwise (e.g., if the pause between "Excuse me" and "Could you repeat your answer" is 700 milliseconds, and the intervening duration threshold is 500 milliseconds), a new speech block could be created [407] for the statement "Could you repeat your answer" and, if a check [404] revealed that the speech block for "Excuse me" had not satisfied the requirement(s) to avoid being discarded, the speech block for "Excuse me" could be discarded [406].

Of course, just as it is possible that one of ordinary skill in the art could identify qualified audio [201] in a manner different from that shown in FIG. 3, it is also possible that one of ordinary skill in the art could organize qualified audio into speech blocks [202] in a manner different from that described above with respect to FIG. 4. For example, while the discussion of FIG. 4 focused on a scenario where qualified audio would be appended to a previously created speech block if the time between the two was less than an intervening duration threshold, other factors could be considered in determining whether to append qualified audio to an existing speech block. For instance, in some embodiments there might be different intervening duration thresholds which would be used depending on the status of the existing speech block (e.g., if the existing speech block has a status of committed, a longer intervening duration threshold could be used than if the existing speech block has a status of pending, such as 7000 milliseconds versus 1000 milliseconds, which could reflect the fact that a speech block with status of 'committed' could indicate the capture of sustained speech, with an increased likelihood that the same speaker may begin speaking after a short silence).

Variations on triggers used in organization of qualified (or other) audio into speech blocks are also possible. For example, it is possible that a process such as shown in FIG. 4 could be triggered by receipt/identification of individual frames and performed on a frame by frame basis, with individual frames having a duration much shorter than the minimum speech block length (e.g., a frame could have a duration of $\frac{1}{30}^{th}$ of a second, while the minimum length for a speech block could be 3-4 seconds). In such a case, a process such as shown in FIG. 4 could be modified by eliminating the check [409] of whether a newly created speech block exceeds the minimum speech block length, since, at the time of its creation, it would have a length equal to the length of the frame. This could have the beneficial effect of allowing a system which performs frame by frame analysis to combine multiple words in a single statement into a single speech block, despite the fact that the frames making up those words would likely be separated by periods of silence representing pauses between words by the speaker. Similarly, the disclosed technology could be used to implement a method for organization of qualified audio into speech blocks in which actions are triggered by events other than (or in addition to) the receipt/identification of audio. For example, a method such as illustrated in FIG. 4 could be modified to, when a new speech block is created, set a timer which would cause the speech block to be discarded if, by the end of the timer's period (e.g., a period of time equal to the minimum speech block length, a period of time equal to the minimum speech block length+the intervening duration threshold, etc) the speech block had not had its status changed to committed.

Other variations are also possible. For example, while the discussion of FIG. 4 focused on determining whether to add qualified audio to a speech block based on comparing the start time of the qualified audio and the end time of the speech block, the opposite comparison (i.e., comparing the end time of the qualified audio and the start time of the speech block) could also be performed in some implementations. To illustrate, consider an implementation where a computer is configured to organize qualified audio into speech blocks by comparing the periods of silence between the qualified audio and the relevant speech blocks to different duration thresholds depending on the relevant speech blocks' status. In this type of implementation, it is possible that qualified audio received before a speech block and separated from the speech block by more than the intervening duration threshold for a speech block with a status of pending would be discarded, even if the duration of the period separating the speech block from the qualified audio is small enough that the qualified audio would have been added if it had been received/identified after the speech block was committed. To account for this type of scenario, in which qualified audio can be treated differently depending on whether it is received before or after a speech block, the disclosed technology can be used to implement a system in which, when a speech block is committed, that commitment could be used as a trigger to compare the end time of the most recent preceding qualified audio with the start time of the speech block, and to add that qualified audio to the speech block if the period separating that qualified audio from the speech block is less than the maximum intervening duration for a speech block with a status of committed. This process could then be repeated for all preceding qualified audio, until a period of preceding qualified audio is encountered which has an end time separated from the start time of the speech block which is greater than the intervening threshold duration for a speech block with a status of committed.

Of course, these variations on the discussion of FIG. 4, like FIG. 4 itself, are intended to be illustrative only, and are not intended to be treated as an exhaustive listing of variations on the discussion of FIG. 4. Other ways of organizing audio data into speech blocks such as based on factors including whether periods of qualified audio exceed a block duration threshold, whether intervening periods without qualified audio exceed a first intervening duration threshold (for intervening periods preceding a portion of qualified audio exceeding the block duration threshold, or preceding or within a set of portions of qualified audio which collectively exceed the block duration threshold), and whether intervening periods without qualified audio exceed a second intervening duration threshold (for intervening periods following a portion of qualified audio exceeding the block duration threshold, or for intervening periods following a set of portions of qualified audio which collectively exceed the block duration threshold) will be immediately apparent to, and could be implemented without undue experimentation by, those of ordinary skill in the art in light of this disclosure. Accordingly, the above discussion of the organization of qualified audio into speech blocks and variations on the same should not be treated as limiting on the scope of protection provided by this document or any related document.

Figure 5:
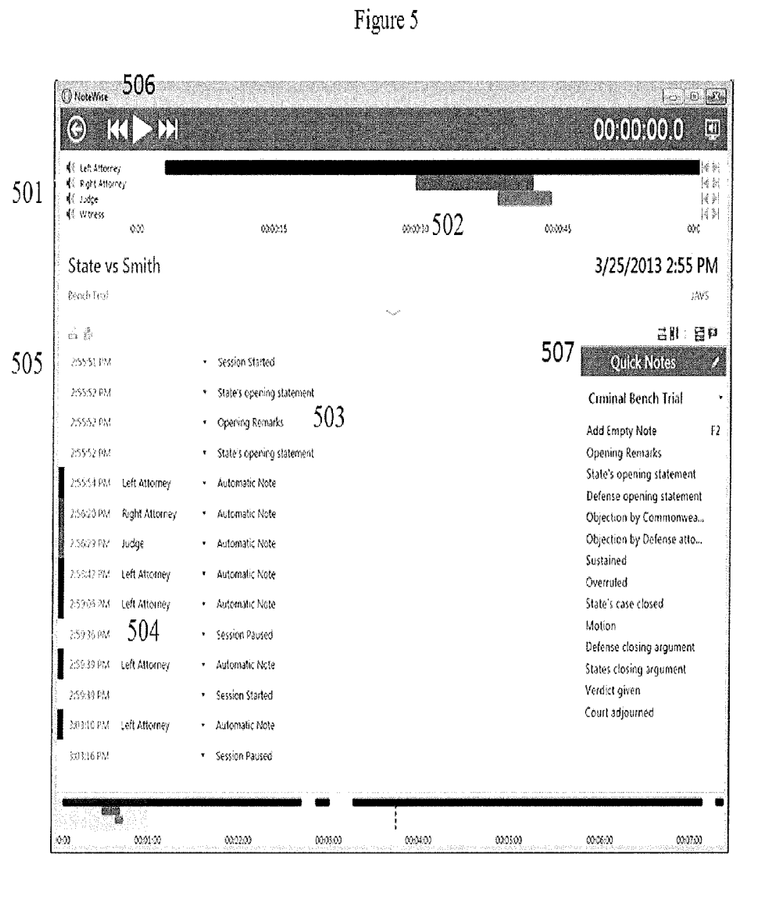
FIG. 5 depicts an example of an interface for user interaction with and display of speech blocks.

Turning now to FIG. 5, that figure depicts an example of a graphical user interface ('GUI') which could be displayed by a computer as part of the presentation [203] of speech blocks to a user. In the GUI of FIG. 5, a number of displays and controls are illustrated, which could be used not only to present information related to the speech blocks to a user, but also to allow the user to gain more information regarding the speech blocks if necessary. For example, in the interface of FIG. 5, a speech block timeline [501] is presented with a legend [502] allowing a user to easily see the time and duration of statements from particular input sources. However, in addition to allowing a user to easily perceive length and duration information, a speech block timeline [501] such as shown in FIG. 5 could also allow a user to easily play back a speech block or portion of a speech block (e.g., by clicking/double clicking on a speech block in a timeline [501] if the timeline was displayed by a computer configured to play back a speech block in response to a user clicking on it, or by using controls [506] to start or stop playback and/or to skip forward or backward within a speech block) if more information on what was said at a particular time is necessary. This could be useful, for example, in cases where the user is responsible for transcribing the multi-party meeting, and so would benefit from having the ability to quickly identify and play back audio from a particular input source during a period of time corresponding to a statement received from that input source, even though such a statement might include periods of silence (e.g., pauses between words or phrases) or short bursts of sound that might be treated as noise by simple waveform analysis (e.g., in the statement "Yes.<pause> I think that's a good idea." The initial "Yes" might be short enough that it would normally be treated as noise).

An interface such as shown in FIG. 5 can also be used to enter and/or manipulate information related to the displayed speech blocks. For example, the interface of FIG. 5 includes a speech block review list [505] where the speech blocks are shown according to the time at which they began, and where users can modify the labels for the source [504] and content [503] of the speech block. Using an implementation of an interface such as shown in FIG. 5 which is updated in real time (e.g., based on information from a computer configured to identify qualified audio [201] and organize that audio into speech blocks [202] on a frame by frame basis) can allow a user to watch speech blocks being created, can accept or modify the source labels [504], and can add notes and labels [503] describing the content of the speech blocks as they are being created. Other tools, such as a variety of pre-configured "Quick Notes" [507] which can be selected to quickly assign labels [503] to the speech blocks as they arrive, can also be included in an interface used for presentation [203] of speech blocks, with the specific tools being which are appropriate for a particular interface varying based on factors such as the context in which the interface is used.

Of course, it should be understood that, like the processes discussed previously, the interface depicted in FIG. 5 is intended to be illustrative only, and should not be treated as limiting. As an example of a potential variation on the interface shown in FIG. 5, it is possible that in some implementations, a speech block timeline such as that shown in FIG. 5 might be made accessible in isolation, such as through a web browser, though a dedicated application running on a computer such as that shown in FIG. 1, or via a tablet or other mobile device in communication with a computer configured to receive and process audio data as described. These types of configurations could be used to facilitate multiple users to observing recorded speech blocks in real time, or even allow for a single user to observe multiple multi-party interactions from a remote location. Similarly, the speech block review list [505] could be made available in simplified form and accessible via web browser or mobile device, facilitating the review, labeling and notating of speech blocks by multiple users in real time. As another example of a variation, rather than identifying sources of input data with names of individual roles (i.e., left attorney, right attorney, judge, witness, as shown in FIG. 5), sources of input data could be identified by locations (e.g., boardroom, meeting room), which might be appropriate in cases where, rather than being associated with (e.g., clipped onto, in the case of lapel microphones) individual people, audio input devices are associated with groups of people located in a single location (e.g., a boardroom).

Similarly, while the interface of FIG. 5 was depicted as a visual interface, non-visual interfaces, or interfaces with non-visual tools are also possible. For example, an interface used to present speech blocks to a user could allow a user to add a note by speaking the desired note into a microphone, and would automatically store the note and associated it with the appropriate portion of a selected speech block. As a further variation, such note taking functionality could be augmented by combining it with the same type of analysis applied to audio data from sources other than the user. For example, to minimize the risk that a noise inadvertently detected by a user's microphone would be treated as a note, audio data from the user's microphone could be measured against the thresholds used to identify and organize qualified audio, with the sounds captured by the user's microphone only treated as a note if they would have satisfied the requirements to avoid being discarded had they been captured by one of the other audio data input sources.

Further variations on, and features for, the inventors' technology will be immediately apparent to, and could be practiced without undue experimentation by, those of ordinary skill in the art in light of this disclosure. Accordingly, instead of limiting the protection accorded by this document, or by any document which is related to this document, to the material explicitly disclosed herein, the protection should be understood to be defined by the claims, if any, set forth herein or in the relevant related document when the terms in those claims which are listed below under the label "Explicit Definitions" are given the explicit definitions set forth therein, and the remaining terms are given their broadest reasonable interpretation as shown by a general purpose dictionary. To the extent that the interpretation which would be given to such claims based on the above disclosure is in any way narrower than the interpretation which would be given based on the "Explicit Definitions" and the broadest reasonable interpretation as provided by a general purpose dictionary, the interpretation provided by the "Explicit Definitions" and broadest reasonable interpretation as provided by a general purpose dictionary shall control, and the inconsistent usage of terms in the specification or priority documents shall have no effect.

EXPLICIT DEFINITIONS

When appearing in the claims, a statement that something is "based on" something else should be understood to mean that something is determined at least in part by the thing that it is indicated as being "based on." When something is completely determined by a thing, it will be described as being "based EXCLUSIVELY on" the thing.

When used in the claims, "cardinality" should be understood to refer to the number of elements in a set.

When used in the claims, "computer" should be understood to refer to a device, or group of devices, which is capable of performing one or more logical and/or physical operations on data to produce a result. Non-limiting examples of "computers" include servers, laptops, desktops, netbooks, and notebooks, as well as handheld devices such as cellular phones, personal digital assistants, and portable game consoles.

When used in the claims, "computer executable instructions" should be understood to refer to data which can be used to specify physical or logical operations which can be performed by a computer.

When used in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space. Computer memory such as hard discs, read only memory, random access memory, solid state memory elements, optical discs and registers is an example of a "computer readable medium."

When used in the claims, "configured" should be understood to mean that the thing "configured" is adapted, designed or modified for a specific purpose. An example of "configuring" in the context of computers is to provide a computer with specific data (which may include instructions) which can be used in performing the specific acts the computer is being "configured" to do. For example, installing Microsoft® WORD on a computer "configures" that computer to function as a word processor, which it does by using the instructions for Microsoft WORD in combination with other inputs, such as an operating system, and various peripherals (e.g., a keyboard, monitor, etc).

When used in the claims, "determining" should be understood to refer to generating, selecting, defining, calculating or otherwise specifying something. For example, to obtain an output as the result of analysis would be an example of "determining" that output. As a second example, to choose a response from a list of possible responses would be a method of "determining" a response. As a third example, to identify data received from an external source (e.g., a microphone) as being a thing would be an example of "determining" the thing.

What is claimed is:

1. A method comprising:
   a) using a computer, identifying qualified audio on each of a plurality of audio input data streams by:
      i) identifying any unique signals on any of the plurality of audio input data streams which exceed an amplitude threshold as qualified audio; and
      ii) when similar signals exceeding the amplitude threshold are detected on multiple audio input data streams, identifying only the loudest of the similar signals as qualified audio;
   b) for each of the audio input data streams, identifying a set of speech blocks, each of which has a status and a start time, by, for each frame in the audio input data stream:
      i) executing code configured to add the current frame to a most recently created speech block if and only if:
         A) the most recent preceding frame corresponding to qualified audio has a time which differs from a time for the current frame by less than a first intervening duration threshold, and the status of the most recently created speech block is pending; or
         B) the most recent preceding frame corresponding to qualified audio has a time which differs from the time for the current frame by less than a second intervening duration threshold, and the status of the most recently created speech block is committed;
      ii) if the current frame is not added to the most recently created speech block, and the current frame corresponds to qualified audio, executing code configured to create a new speech block, wherein:
         A) the start time for the new speech block is the time for the current frame; and
         B) the status for the new speech block is pending;
      iii) if the status of the most recently created speech block is pending, executing code configured to change the status of the most recently created speech block to discarded if and only if:
         A) the current frame does not correspond to qualified audio;
         B) the most recent preceding frame corresponding to qualified audio has a time which differs from the time for the current frame by more than the first intervening duration threshold; and
         C) the status of the most recently created speech block is pending;
      iv) if the status of the most recently created speech block is pending, executing code configured to change the status of the most recently created speech block to committed if and only if:
         A) the current frame corresponds to qualified audio; and
         B) the start time for the most recently created speech block speech block precedes the time for the current frame by more than a minimum block duration threshold;
   c) presenting a speech block interface to a user, wherein:
      i) the speech block interface displays, for each audio input data stream, a timeline of speech blocks for the audio input data stream, the timeline being updated in real time as the qualified audio for the audio input data streams is identified;
      ii) the speech block interface is configured to allow the user play a portion of an audio input data stream corresponding to a speech block by selecting the speech block to be played;
      iii) the speech block interface is configured to allow the user to skip from each displayed speech block to a previous or subsequent displayed speech block; and
      iv) the speech block interface is configured not to display discarded speech blocks, to display pending speech blocks semitransparently, and to display committed speech blocks opaquely.

2. A method comprising:
   a) filtering a plurality of audio input data streams by, for any overlapping period wherein an overlapping period is a period in which signals differing only in volume are included in two or more audio input data streams from the plurality of audio input data streams, exclude the signal from each of the two or more audio input data streams except for the loudest of the two or more audio input data streams for the overlapping period;
   b) for each of the filtered audio input data streams, defining a set of speech blocks using a computer, wherein, for each speech block for the filtered audio input data stream,
      i) the speech block comprises a base period, wherein the base period has a duration longer than a first duration threshold, and wherein the filtered audio input data stream's volume exceeds a volume threshold throughout the base period except for lapses corresponding to normal pauses between words in speech;
      ii) the speech block comprises a set of additional periods, wherein, for each of the additional periods:
         A) the filtered audio input data stream's volume exceeds the volume threshold throughout the additional period except for lapses corresponding to normal pauses between words in speech; and B) if the additional period has a duration longer than the first duration threshold, there is no intervening period between the additional period's end and the base period's start which has a duration longer than a second duration threshold and which has a volume which is lower than the volume threshold during the intervening period;

C) if the additional period has a duration which is not longer than the first duration threshold, there is no intervening period between the additional period's end and the base period's start which has a duration longer than third duration threshold and which has a volume which is lower than the volume threshold during the intervening period, wherein the third duration threshold is shorter than the second duration threshold;

iii) the start of the earliest period comprised by the speech block is defined as the speech block's start; and iv) the end of the latest period comprised by the speech block is defined as the speech block's end;

c) presenting a speech block interface to a user, wherein:

i) the speech block interface displays, for each audio input data stream, a timeline of each speech block from the audio input data stream, the timeline being updated in real time as the audio input data streams are received;

ii) the speech block interface is configured to allow a user play a portion of an audio input data stream corresponding to a speech block from the audio input data stream by selecting the speech block to be played; and iii) the speech block interface is configured to allow the user to skip from each block to a previous or subsequent speech block.

* * * * *